United States Patent [19]

Grant et al.

[11] Patent Number: 5,154,371
[45] Date of Patent: Oct. 13, 1992

[54] MAIN ROTOR ASSEMBLY SUPPORT TRUSS

[75] Inventors: Peter L. Grant, Hamden; Darryl M. Toni, North Haven, both of Conn.

[73] Assignee: United Technologies Corporation, Hartford, Conn.

[21] Appl. No.: 683,211

[22] Filed: Apr. 10, 1991

[51] Int. Cl.⁵ .............................................. B64D 27/00
[52] U.S. Cl. .................................... 244/17.27; 244/54
[58] Field of Search .................... 244/17.27, 17.11, 54; 416/244 R, 500; 248/554-559

[56] References Cited

U.S. PATENT DOCUMENTS

| | | | |
|---|---|---|---|
| 2,155,881 | 4/1939 | Wilford et al. | 244/17.27 |
| 2,530,467 | 11/1950 | Hunt | 244/17.27 |
| 3,050,275 | 8/1962 | Kottsieper | 244/17.27 |
| 3,698,663 | 10/1972 | Balke et al. | 244/17.27 |
| 4,458,861 | 7/1984 | Mouille | 244/17.27 |

*Primary Examiner*—Galen Barefoot
*Attorney, Agent, or Firm*—Terrance J. Radke

[57] ABSTRACT

A support truss for the main rotor assembly of a helicopter is configured to structurally support the main rotor assembly in integrated combination with the helicopter airframe and to transmit dynamic and static longitudinal, lateral, vertical, and torsional loads of the main rotor assembly into the helicopter airframe at two distinct, spaced-apart load transfer levels. The support truss is an integrally formed structure that includes a generally cylindrical body member configured to provide attachment points for the static rotor mast and the transmission of the main rotor assembly, a pair of forward facing primary support ribs configured to secure the support truss to a primary load transfer level of the helicopter airframe and to transmit dynamic and static longitudinal, lateral, vertical, and all torsional loads to the primary load transfer level, and a pair of aft facing support struts configured to secure the support truss to a secondary load transfer level and to transmit only axial loads to the secondary transfer level. The support truss also includes a forward facing secondary support rib that provides fail-safe redundancy in the event of a loss of one of the primary support ribs. The support truss may also include a cross stringer extending between and integrally interconnecting the primary and secondary support ribs. A plurality of servo lugs may be integrally formed with the body member to provide lower attachment points for rotor servo actuators of the main rotor assembly.

15 Claims, 5 Drawing Sheets

MAIN ROTOR ASSEMBLY SUPPORT TRUSS

This invention was made under a Government contract and the Government has rights therein.

TECHNICAL FIELD

The subject matter of the present invention relates generally to helicopters, and more particularly, to a support truss that is configured to structurally support the main rotor assembly of a helicopter in integrated combination with the helicopter airframe and to transmit dynamic and static loads of the main rotor assembly into the helicopter airframe at two different load transfer levels.

BACKGROUND OF THE INVENTION

Large magnitude dynamic and static longitudinal, lateral, vertical, and torsional loads are developed by the main rotor assembly of a helicopter. Helicopter design methodology utilizes a support structure to integrate elements of the main rotor assembly such as the static rotor mast and the engine transmission in combination with the airframe of the helicopter. Such support structures are configured to transmit the dynamic and static longitudinal, lateral, vertical, and torsional loads developed by the main rotor assembly to the airframe of the helicopter at a single load transfer level (the transmission deck).

Representative embodiments of prior art main rotor assembly (MRA) support structures are illustrated in FIGS. 1A-1C. FIGS. 1A, 1B depict standpipe support structures SP having a plurality of attachment feet AF. FIG. 1A represents the configuration of a generalized embodiment of the standpipe support structure SP. The static rotor mast and the transmission of the main rotor assembly are integrated with the attachment collar AC of the standpipe support structure SP. FIG. 1B illustrates the particularized embodiment of the standpipe support structure SP currently utilized on Sikorsky Blackhawk and S-76 helicopters. In this type of standpipe support structure SP, the transmission housing TH of the main rotor assembly comprises the body of the support structure, including the attachment feet AF. The static rotor mast is integrated with the attachment collar THAC of the transmission housing TH.

Each of the above-described embodiments of MRA standpipe support structures SP is secured to the transmission deck of the helicopter by means of bolts passing through the attachment feet AF. The dynamic and static loads of the main rotor assembly are transmitted to a single load transfer level of the airframe (the transmission deck) via the attachment feet AF. Prior art standpipe support structures offer several advantages, including relative ease and low cost of fabrication as an integral unit, and ease of attachment to the transmission deck. Due to the relatively uncluttered configuration of prior art standpipe support structures SP, hydraulic lines, subsystem wiring, and other interfacing elements typically routed over the transmission deck may be readily run over/adjacent the exterior surface of prior art standpipe support structures SP.

On the other hand, prior art standpipe support structures SP are disadvantageous in several respects. Due to the manner of integration of the transmission with the standpipe support structure, the transmission housing acts as a structural member through which the dynamic and static loads of the main rotor assembly are intermediately transmitted. Moreover, the weight of the standpipe support structure is relatively large because of the high structural strength required of the support structure.

The high strength requirement is due primarily to the low profile configuration of the support structure and the effective load points of the main rotor assembly dynamic and static loads to which the standpipe support structure SP is subjected. The effective load points of the dynamic and static loads of the main rotor assembly have relatively large moment arms with respect to the low profile support structure, see FIG. 1D, which intensifies the loading effects experienced at the attachment feet AF (concomitantly, these loading effects also necessitate an increase in airframe structural strength in the load transfer zones (hardpoints) of the transmission deck). In addition, each of the attachment feet AF must be sized to accommodate the ultimate flight load conditions (fail-safe redundancy) and crashworthiness high mass retention (controlled displacement of the main rotor assembly in crashes).

Routine maintenance is more time consuming and labor intensive for prior art standpipe-type support structures SP. Any type of transmission maintenance (including removal of the transmission) requires removal of the rotor head, mast, and associated components prior to initiation of maintenance. The removed components must be reassembled and the operation thereof checked after completion of any routine transmission maintenance/overhaul.

An MRA strut support structure ST is illustrated in FIG. 1C. The strut-type support structure ST is currently utilized on the McDonnell-Douglas Apache attack helicopter. The strut support structure ST is a high profile configuration comprising an integration member IM, and a plurality of struts S such as cylindrical rods or machined legs extending from the integration member IM and terminating in attachment feet AF.

The static rotor mast of the main rotor assembly is attached to the integration member IM in a manner similar to the standpipe support structure ST. The transmission, however, is attached in suspended combination to the underside of the integration member IM, and consequently, is not part of the transmission path for the dynamic and static loads of the main rotor assembly. The attachment feet AF of the MRA strut support structure ST are utilized to secure the support structure to the airframe of the helicopter and to transfer dynamic and static loads of the main rotor assembly to respective hardpoints of a single level load transfer plane (transmission deck).

Due to the high profile configuration of the MRA strut support structure ST, however, the dynamic and static loads of the main rotor assembly are transmitted to single load transfer plane through the integration member IM. In consequence, the loading effects at the attachment feet AF (and in the respective hardpoints of the transmission deck) are not as severe as those experienced in the standpipe-type support structure ST.

Each of the struts S must be equally sized to react the maximum longitudinal, lateral, vertical, and torsional dynamic loads developed by the main rotor assembly, which increases the overall weight of the MRA strut support structure ST. Moreover, in light of the high profile configuration of the strut support structure ST, each strut S must be oversized to accommodate not only the dynamic loading developed by the main rotor assembly, but also the bending stresses that may be experienced in the event of the loss of any one strut S (fail-safe redundancy).

The routing of hydraulic lines, electrical subsystem wiring, and other interface components along the transmission deck is complicated by the network of struts S. Transmission maintenance and/or removal is simplified to the extent that access to the transmission does not require removal of the main rotor head, static rotor mast, and associated components. However, extraneous time and labor is required for transmission maintenance/removal inasmuch as one set of struts S must be removed to access the transmission. The configuration of MRA strut support structure ST is more complex than the MRA standpipe support structure SP, thereby requiring more time and labor to install and/or remove the strut-type support structure ST.

A need exists for a MRA support structure that has a relatively simple configuration with a relatively high profile. The support structure should be lightweight, inexpensive, relatively simple to fabricate, and readily secured to the helicopter airframe. Such a support structure should have a configuration that facilitates integration of the main rotor assembly therewith in such a manner that the engine transmission is non-structural (does not act as a transmission path for dynamic and static loads of the main rotor assembly). The support structure should provide fail-safe redundancy (ballistic tolerance) and crashworthiness high mass retention without a corresponding increase in structure weight.

The support structure should facilitate access to the transmission for maintenance/removal, i.e., not require removal of components of the main rotor assembly. The support structure should also facilitate routing of hydraulic lines, electrical subsystem wiring, and other interface components along the transmission deck.

SUMMARY OF THE INVENTION

A main rotor assembly (MRA) support truss according to the present invention has a relatively simple configuration that is lightweight, relatively simple and inexpensive to fabricate, facilitates access to the transmission for maintenance/overhaul, and facilitates routing of hydraulic lines, electrical subsystem wiring, and other interface components along the transmission deck. The configuration of the support truss is readily secured to the helicopter airframe, and facilitates integration of the main rotor assembly therewith. The MRA support truss of the present invention is configured for utilization with helicopters having a gusset structure that is located at the forward end of the transmission deck and which extends vertically upwardly with respect thereto.

The MRA support truss is structurally configured to support elements of the main rotor assembly of a helicopter such as the static rotor mast and the transmission in integrated combination with the airframe of the helicopter. The configuration of the MRA support truss is operative to transmit dynamic and static longitudinal, lateral, vertical, and torsional loads of the main rotor assembly into the airframe of the helicopter. The configuration provides transmission paths for dynamic and static loading into airframe hardpoints at two different load transfer levels.

The MRA support truss is an integral forged structure that is machined to final configuration, and is preferably formed from a high strength, electrically conductive metallic material such as an aluminum alloy. An MRA support truss formed from an electrically conductive material may be utilized as the primary electrical ground bus for electrical subsystems of the helicopter, and in addition, may function as a highly conductive path for lightning strikes.

The MRA support truss comprises a cylindrical body member, a pair of aftwardly extending support struts terminating in attachment feet, a pair of forward facing primary support ribs terminating in attachment feet, and a forward facing secondary support rib, positioned intermediate the primary support ribs, terminating in an attachment foot. A cross stringer extends between and integrally interconnects the primary and secondary support ribs. The attachment feet are configured to secure the MRA support truss to the helicopter airframe at two distinct, spaced-apart load transfer levels.

The primary support ribs function as a shear attachment for the MRA support truss to the airframe structural members of the gusset structure. The primary support ribs are operative to transmit dynamic and static longitudinal, lateral, vertical, and all torsional loads developed by the main rotor assembly to the helicopter airframe at the primary load transfer level.

Since the primary support ribs comprise the primary load transfer structure of the MRA support truss, they are sized accordingly—higher weight to provide increased structural strength. The primary support ribs, however, have a low profile configuration with respect to the centers of gravity of the elements of the main rotor assembly contributing to dynamic and static loading such that upsizing the primary support ribs does not provide a significant increase in overall weight to the MRA support truss.

The aft support struts provide a tension attachment for the MRA support structure to the keel beams of the transmission deck that defines the secondary load transfer level of the helicopter airframe. The aft support struts are operative to transmit only axial loads to the second load transfer level. Because of the limited load transmission function of the aft support struts, they may have a downsized configuration, i.e., less weight.

Due to the downsized configuration and limited load transmission function of the aft support struts, they also provide a unique crashworthiness high mass retention function for the MRA support truss. Fail-safe redundancy is provided by the secondary support rib.

The MRA support truss further includes an upper attachment flange for securing the static rotor mast in combination with the MRA support truss and a lower attachment flange for securing the transmission in suspended combination with the MRA support truss. The cylindrical body member of the MRA support truss may also be configured to include a plurality of integral servo lugs that function as lower attachment points for rotor servo actuators of the main rotor assembly.

BRIEF DESCRIPTION OF THE DRAWINGS

A more complete understanding of the present invention and the attendant advantages and features thereof will be more readily comprehended by reference to the following detailed description when considered in conjunction with the accompanying drawings wherein.

DETAILED DESCRIPTION OF PREFERRED EMBODIMENTS

Figure 1A:
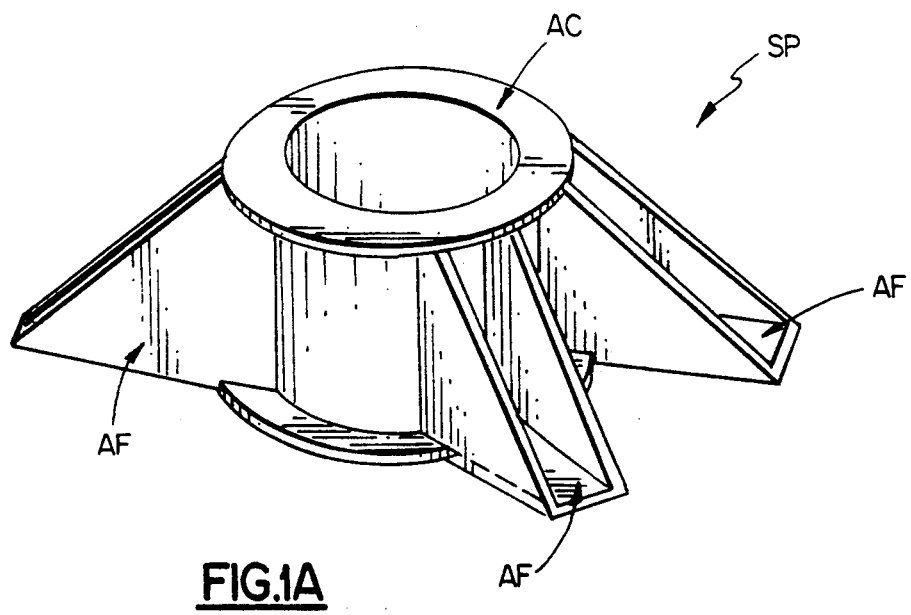
FIGS. 1A, 1B illustrate prior art standpipe support structures for the main rotor assembly of a helicopter.
Figure 1B:
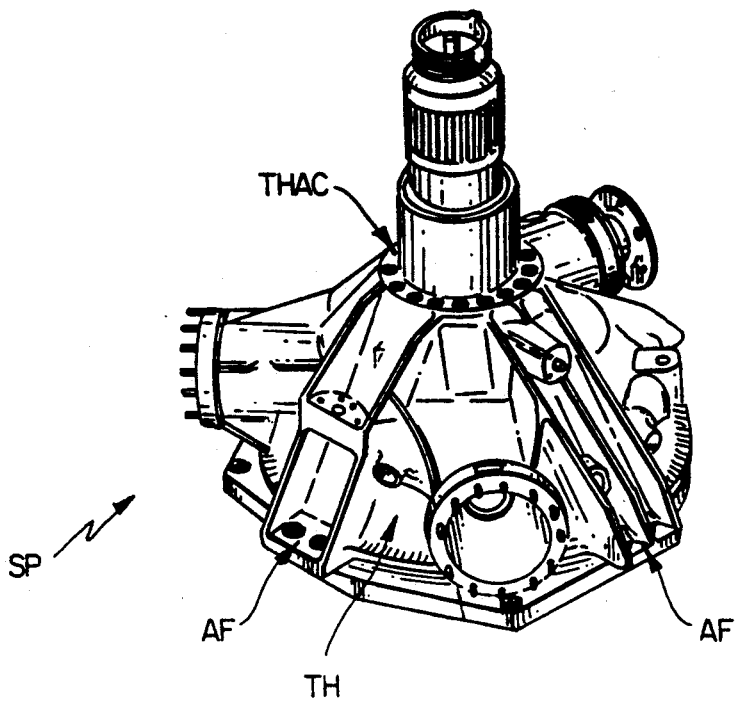
Figure 1C:
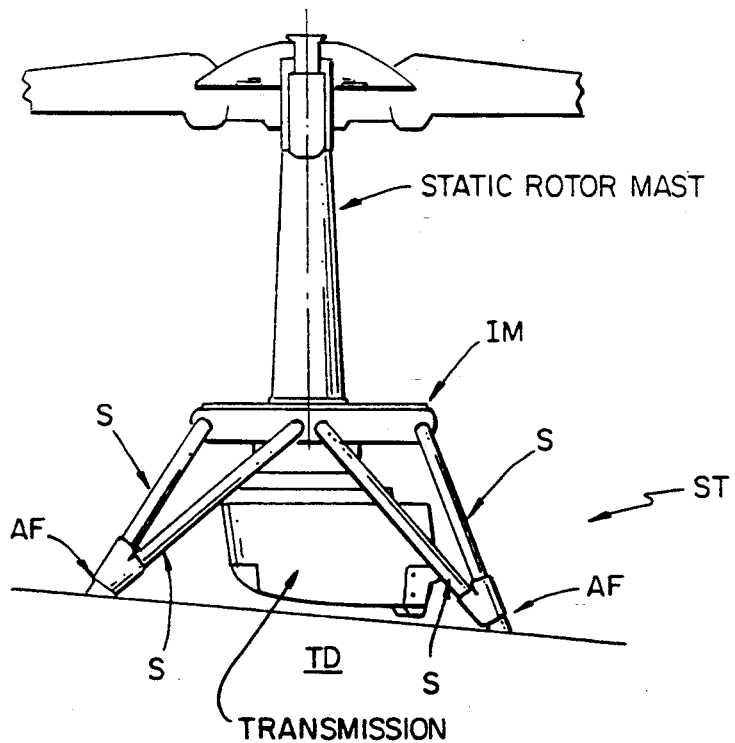
FIG. 1C illustrates a prior art strut support structure for the main rotor assembly of a helicopter.
Figure 1D:
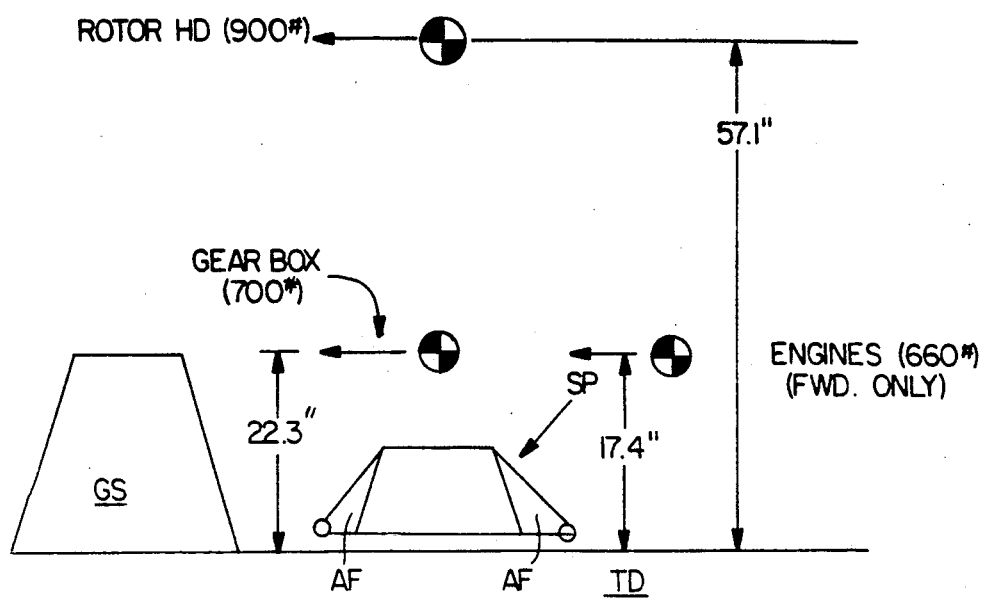
FIG. 1D is an exemplary representation of the dynamic loading experienced by the standpipe support structure of FIG. 1A.
Figure 2:
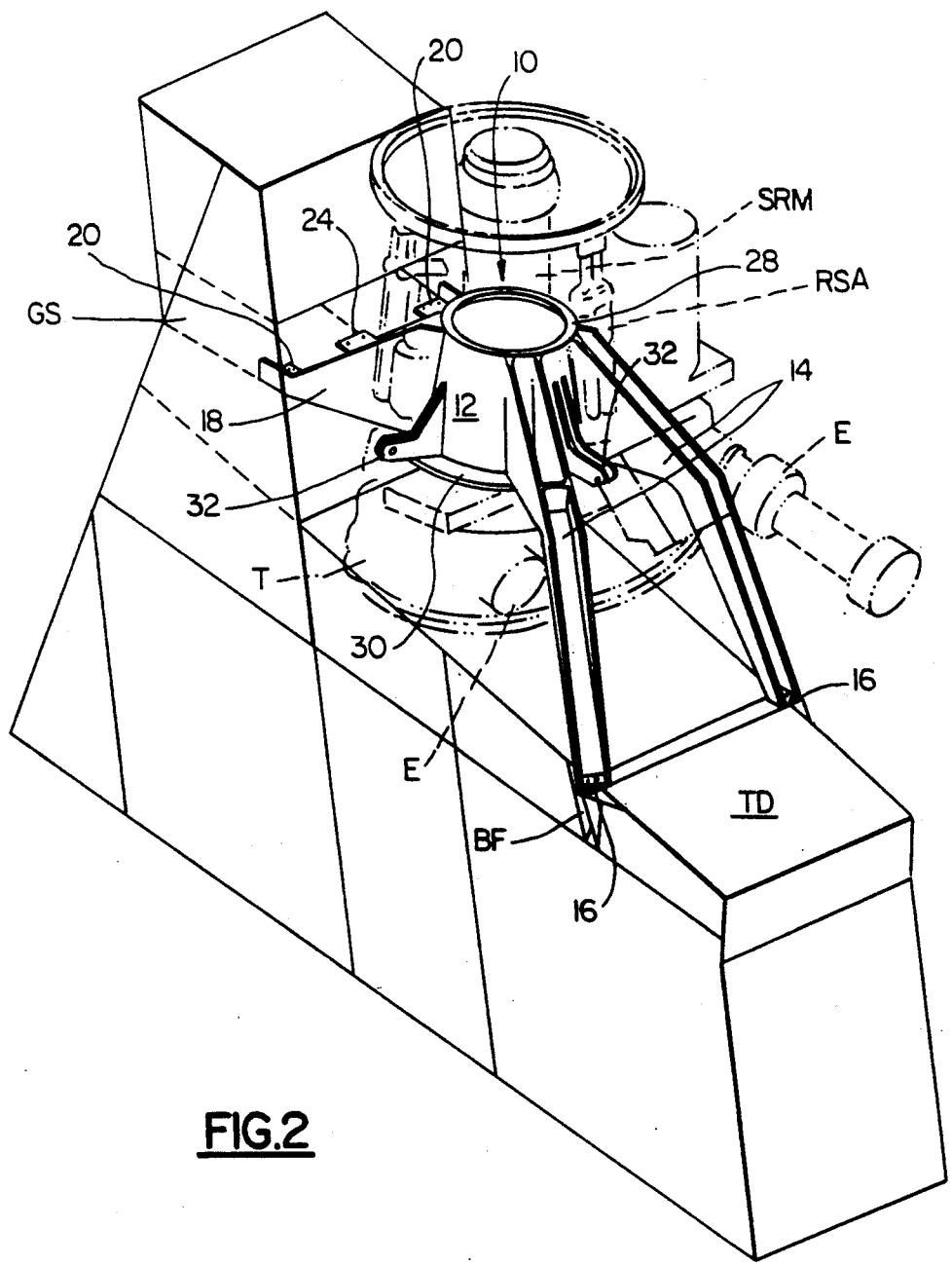
FIG. 2 is a first perspective view of one embodiment of a support truss for a main rotor assembly according to the present invention.
Figure 3:
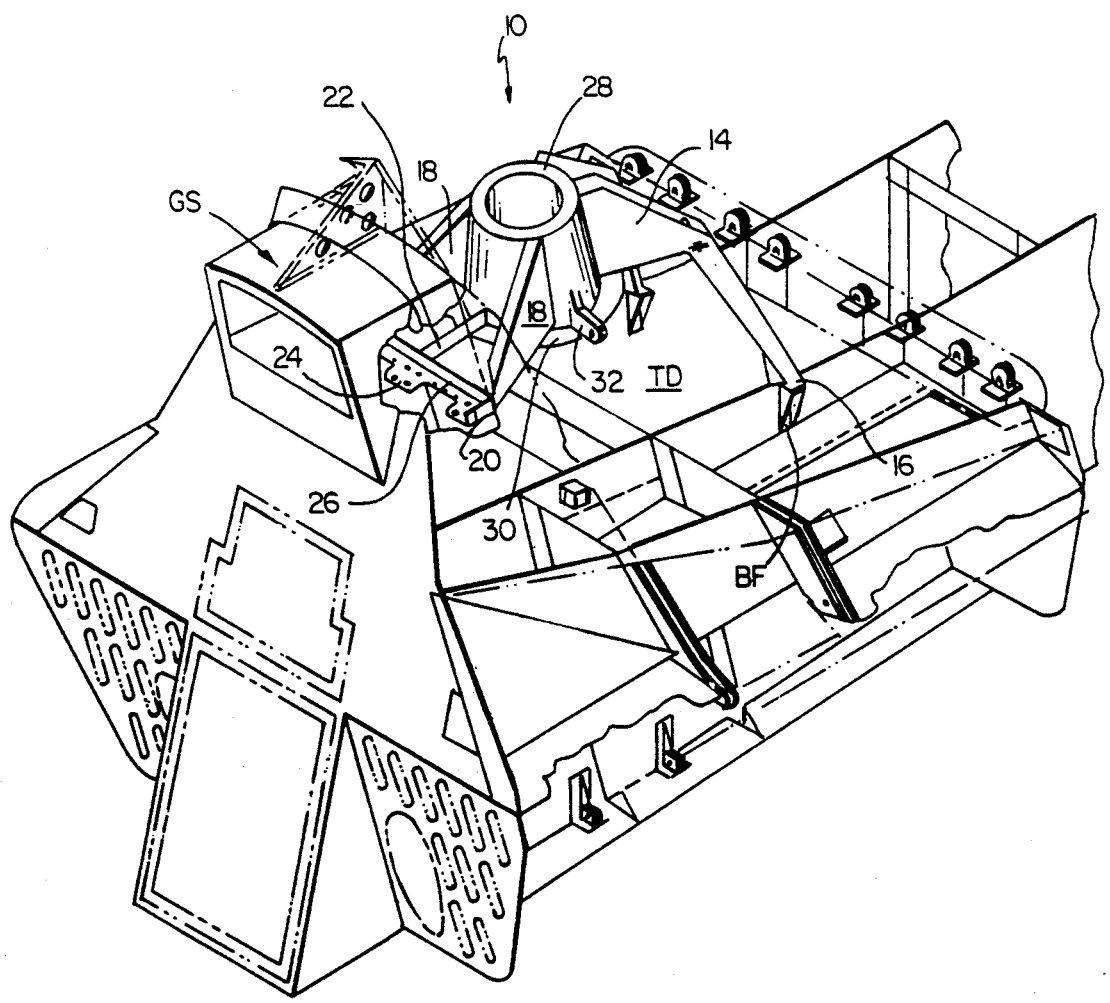
FIG. 3 is a second perspective view of the main rotor assembly support truss of FIG. 2.

Referring now to the drawings wherein like reference numerals identify corresponding or similar elements throughout the several views, FIGS. 2, 3 illustrate one exemplary embodiment of a main rotor assembly (MRA) support truss 10 according to the present invention. The MRA support truss 10 is configured to structurally support elements of a helicopter main rotor assembly such as the static rotor mast SRM and the transmission T in integrated combination with the airframe of a helicopter (not shown). Also illustrated in FIG. 2 are portions of the helicopter engines E which, although not directly attached to the MRA support truss 10, transmit dynamic loads to the MRA support truss 10 via the transmission T (see also FIG. 4). In addition, the MRA support truss 10 may be configured to provide servo lugs as lower attachment points for the rotor servo actuators of the main rotor assembly.

The configuration of the MRA support truss 10 is operative to transmit dynamic and static longitudinal, lateral, vertical, and torsional loads developed by the main rotor assembly into the airframe of the helicopter. The configuration of the MRA support truss 10 provides two transmission paths for such dynamic and static loads into airframe hardpoints (attachment points) at two distinct, spaced-apart load transfer levels or planes of the helicopter airframe.

The prior art MRA support structures discussed hereinabove are configured to transmit the dynamic and static loads of the main rotor assembly into the helicopter airframe at a single load transfer level or plane. This load transfer level is the transmission deck of the helicopter that lies superjacent the fuselage center box-beam. In contrast, the MRA support truss 10 of the present invention transmits dynamic and static main rotor assembly loads at a primary load transfer level and a secondary load transfer level. The secondary load transfer level is the transmission deck TD of the helicopter. The primary load transfer level is a gusset structure GS.

The MRA support structure 10 of the present invention is configured to be utilized in helicopters having a gusset structure GS that is located at the forward end of the transmission deck TD and which extends vertically upwardly with respect thereto. In such helicopters, the gusset structure GS is a preexisting structural feature that performs several structural functions. The gusset structure GS supports the seat of the copilot (which is situated directly behind and elevated in plane with respect to the pilot's seat). The gusset structure GS further acts as the upper support structure for the helicopter canopy. The main shock struts of the landing gear may extend into and be supported by the gusset structure GS. The gusset structure GS may also serve as a mounting point for a wire cutter, a device for severing power or phone transmission lines or the like before they contact the main rotor assembly. With reference to FIGS. 2. 3, the gusset structure GS is identified by the reference letters GS while the transmission deck is identified by the reference letters TD.

The MRA support truss 10 of the present invention is an integrally forged structure that is machined to final form. The relatively simple configuration of the MRA support truss 10 simplifies the process of fabricating the support truss 10 as an integral structure, and also facilitates mounting of the support truss 10 in combination with the helicopter airframe. The MRA support truss 10 is preferably formed from a high strength, electrically conductive metallic material such as an aluminum alloy, e.g., 7075 aluminum.

An MRA support truss 10 fabricated from a high strength conductive metallic material provides additional functions in addition to those described hereinabove. The electrically conductive MRA support truss 10 may be utilized as the primary electrical ground bus for electrical subsystems of the helicopter, thereby providing overall system weight and cost savings. The electrically conductive MRA support truss 10 may also function as a highly conductive path for lightning strikes to the airframe and/or skin of the helicopter.

It is to be understood that the MRA support truss 10 may also be formed from less dense, high strength metallic materials that are poor conductors to lower overall system weight. The use of a lighter weight, non-conductive MRA support truss 10, however, should be examined from a system perspective, i.e., the benefits of the lighter weight support truss should be balanced against such factors as increased cost, installation time, weight, and the ensuing complexity of providing separate electrical ground buses and/or a separate grounding path to the helicopter airframe for lightning strikes.

The MRA support truss 10 according to the present invention comprises a generally cylindrical body member 12, a pair of aftwardly extending support struts 14 terminating in attachment feet 16, a pair of forward facing primary support ribs 18 terminating in attachment feet 20, and a forward facing secondary support rib 22, positioned intermediate the primary support ribs 18, terminating in an attachment foot 24. A cross stringer 26 extends between and is integrally interconnected with the primary support ribs 18 and the secondary support rib 22 adjacent the attachment feet 20, 24 thereof. The cross stringer 26 functions to maintain the structural integrity of the MRA support truss 10 during torsional loading.

The attachment feet 16 of the aft support struts 14 are configured (C-channel close-out flange) to secure the aft support struts 14 to keel beams of the transmission deck TD (via securing bolts). Bathtub fittings BF, which are part of the transmission deck TD, are utilized to integrate the aft support struts 14 in combination with the keel beams. The attachment feet 20, 24 are configured to secure the primary support ribs 18 and the secondary support rib 22, respectively, to airframe structural members of the gusset structure GS (via securing bolts).

Figure 4:
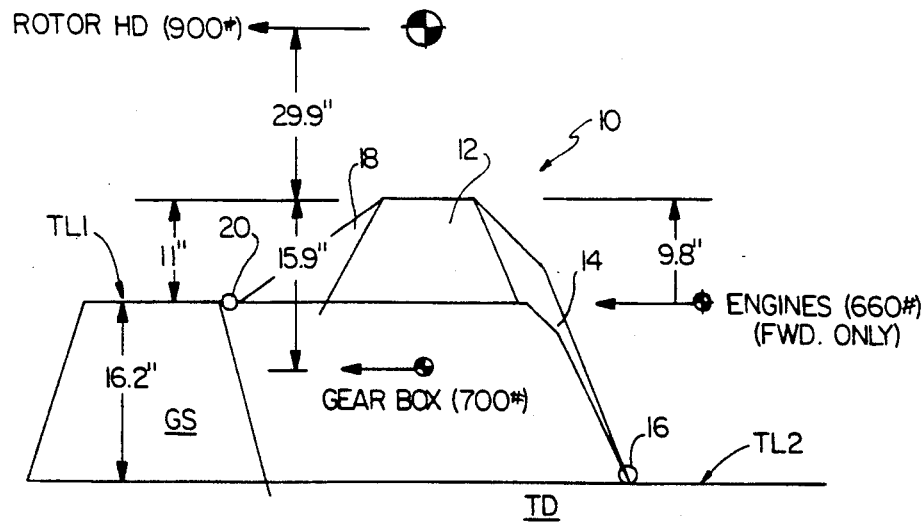
FIG. 4 is an exemplary representation of the dynamic loading experienced by the main rotor assembly support truss according to the present invention.

With reference to FIG. 4, the primary support ribs 18 provide a shear attachment for the MRA support truss 10 to the airframe structural members of the gusset structure GS. The primary support ribs 18 are operative to transmit dynamic and static longitudinal, lateral, vertical, and all torsional loads developed by the main rotor assembly to the gusset structure GS, which is defined as the primary load transfer level TL1. Since the primary support ribs 18 comprise the primary load transfer structure of the MRA support truss 10, they are sized accordingly—higher weight to provide increased structural strength. The primary support ribs 18, however, have a low profile configuration with respect to the centers of gravity of the elements of the main rotor assembly contributing to dynamic and static loading (see discussion hereinabove) such that upsizing the primary support ribs 18 does not provide a significant increase in overall weight to the MRA support truss 10.

The aft support struts 14 provide a tension attachment for the MRA support truss 10 to the keel beams of the transmission deck TD that define a secondary load transfer level TL2. The aft support struts 14 are operative to transmit only axial loads to the second transfer level TL2. Because of the limited load transmission function of the aft support struts 14, they may have a downsized configuration, i.e., less weight.

As a result of the downsized configuration and limited load transmission function of the aft support struts 14, the aft support struts 14 also provide a unique crashworthiness high mass retention function for the MRA support truss 10 according to the present invention. In the event of a vertical crash exceeding worst case design loads (about 20 g's for one embodiment), the aft support struts 14 will fail first, buckling in compression. This causes the MRA support truss 10 to rotate aftwardly about the attachment feet 20, 24 of the primary and secondary support ribs 18, 22. Aftward rotation of the MRA support truss 10 causes a concomitant aftward rotation of the main rotor assembly including the main rotor blades, which greatly reduces the probability of a rotor blade strike on the canopy.

Fail-safe redundancy is provided by the secondary support rib 22 which is sized for crash loads in the event of a loss of either of the primary support ribs 18. In the event of such loss, for example by structural failure or ballistic destruction, the load transmission function of the lost primary support rib 18 will be assumed by the secondary support rib 22. In addition, due to the limited load transmission function of the aft support struts 14, the primary support ribs 18 (or one of the primary support ribs 18 and the secondary support rib 22) possess sufficient structural strength to provide fail-safe redundancy in the event of the loss of one of the aft support struts 14.

Figure 5:
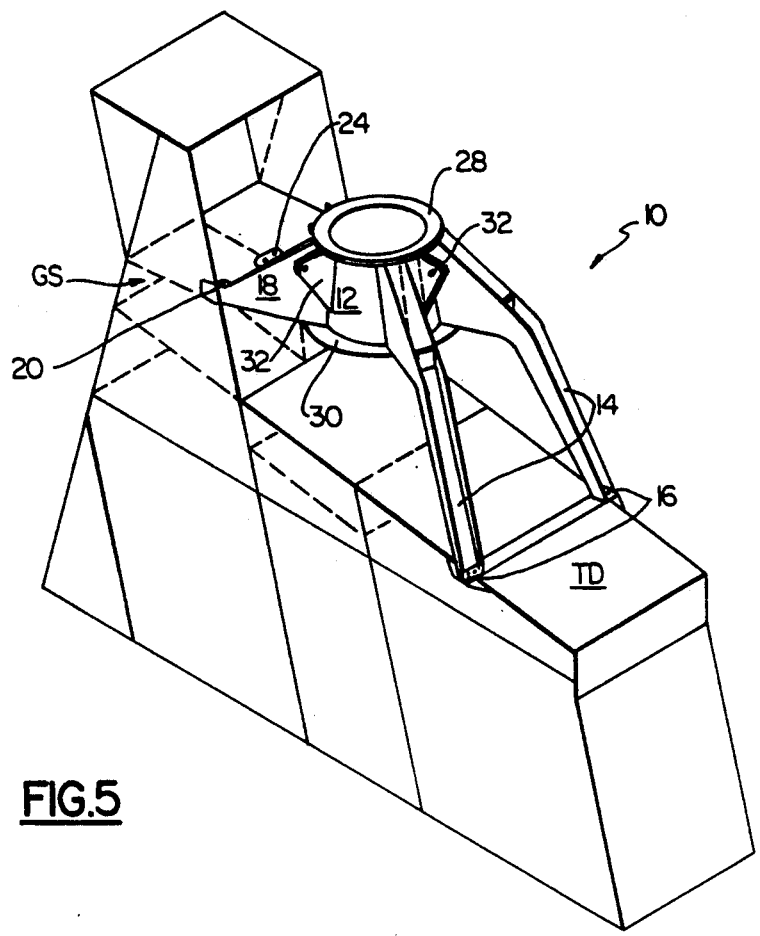
FIG. 5 is a perspective view of another embodiment of a main rotor assembly support truss according to the present invention.

The MRA support truss 10 illustrated in FIG. 2 further includes an upper attachment flange 28 and a lower attachment flange 30. The upper attachment flange 28 is utilized to secure the static rotor mast SRM of the main rotor assembly in combination with the MRA support truss 10. The upper attachment flange 28 illustrated in FIGS. 2, 3 is a reverse flange having a configuration that facilitates integration of the static rotor mast with the MRA support truss 10. The reverse attachment flange 28 also facilitates in-place lowering of the static rotor mast for transportability. Another embodiment of the MRA support truss 10 is depicted in FIG. 5 and illustrates an outwardly extending upper attachment flange 28. With an outwardly extending flange 28, the static rotor mast must be removed for transportability.

The lower attachment flange 30 secures the transmission T in suspended combination with the MRA support truss 10. The suspended transmission is readily accessible (no elements of the MRA support truss 10 need to be removed for, or obstruct, access to the transmission) for maintenance/removal, which significantly reduces the time and labor required for routine transmission maintenance and/or removal.

Dynamic and static loads of the main rotor assembly are transmitted via the static rotor mast to the cylindrical body member 12 of the MRA support truss 10 via the upper attachment flange 28. The main rotor shaft passes through the concentric channel defined by the cylindrical body member 12 for integration with the suspended transmission.

The MRA support truss 10 may also include a plurality, typically three, of servo lugs 32 as illustrated in FIGS. 2, 3 and 5. The servo lugs 32 are integrally formed as part of the cylindrical body member 12 and spaced thereabout. The servo lugs 32 function as lower attachment points for rotor servo actuators RSA (see FIG. 2) of the main rotor assembly. Fabrication of the MRA support truss 10 to include such servo lugs 32 provides an additional advantage over prior art MRA support structures which do not have such a feature, which thereby necessitates the use of separately fabricated and installed anchors for the lower attachment points of the rotor servo actuators.

A variety of modifications and variations of the present invention are possible in light of the above teachings. It is therefore to be understood that within the scope of the appended claims, the present invention may be practiced otherwise than as specifically described hereinabove.

What is claimed is:

1. For a helicopter having a main rotor assembly that develops dynamic and static longitudinal, lateral, vertical, and torsional loads, a transmission, and an airframe that includes a gusset structure and a transmission deck, a main rotor assembly support truss, comprising:

body member means configured for supporting the main rotor assembly in integrated combination with the helicopter airframe, said body member means including means for securing the transmission in suspended combination with said main rotor assembly support truss;

first and second parallel, spaced apart forward facing support ribs integral with said body member means and including means for securing said first and second forward facing support ribs to the gusset structure, said first and second forward facing support ribs provide a shear attachment for said main rotor assembly support truss and are configured and sized for transmitting the dynamic and static longitudinal, lateral, vertical, and all torsional loads of the main rotor assembly to the gusset structure that functions as a primary load transfer plane of the helicopter airframe; and first and second spaced apart aftwardly extending support struts integral with said body member means and including means for securing said first and second aftwardly extending support struts to the transmission deck, said first and second aftwardly extending support struts provide a tension attachment for said main rotor assembly support truss and are configured and sized for transmitting axial loads of the main rotor assembly to the transmission deck that functions as a secondary load transfer plane of the helicopter airframe.

2. The main rotor assembly support truss of claim 1 wherein said body member means further includes lug means integral with said body means for providing lower attachment points for rotor servo actuators of the main rotor assembly.

3. The main rotor assembly support truss of claim 1 wherein said body member means, said first means and said second means are formed from an electrically conductive metallic material and function as an electrical ground bus for electrical subsystems of the helicopter.

4. The main rotor assembly support truss of claim 3 wherein said electrically conductive metallic material is an aluminum alloy.

5. The main rotor assembly support truss of claim 1 wherein said securing means of said body member means is a lower flange attachment means for securing the transmission in suspended combination with said main rotor assembly support truss.

6. The main rotor assembly support truss of claim 1 wherein the main rotor assembly includes a static rotor mast and said body member means further includes an upper flange attachment means for securing the static rotor mast in combination with said main rotor assembly support truss.

7. The main rotor assembly support truss of claim 1 wherein said securing means of each said first and second parallel, spaced apart primary support ribs is an attachment foot for securing said respective forward facing primary support rib to said primary load transfer plane.

8. The main rotor assembly support truss of claim 7 further comprising a secondary forward facing support rib integral with said body member means and disposed intermediate said first and second primary support ribs in parallel, spaced apart relation therewith, said secondary forward facing support rib having an attachment foot for securing said secondary forward facing support rib to said primary load transfer plane, and wherein said secondary forward facing support rib is configured and sized to provide fail-safe redundancy if one of said parallel, spaced apart forward facing primary support ribs is lost.

9. The main rotor assembly support truss of claim 8 further comprising a cross stringer extending transversely between and interconnecting said parallel, spaced apart first and second forward facing primary support ribs and said secondary forward facing support rib.

10. The main rotor assembly support truss of claim 1 wherein said securing means of each said first and second aftwardly facing support struts is an attachment foot for securing said respective aftwardly facing support struts to said secondary load transfer plane.

11. The main rotor assembly support truss of claim 10 wherein said first and second aftwardly facing support struts are further operative to buckle in compression in the event of a helicopter crash exceeding worst case design loads to cause the main rotor assembly to rotate aftwardly.

12. The main rotor assembly support truss of claim 1 wherein said body member means has a cylindrical configuration.

13. The main rotor assembly support truss of claim 12 wherein said securing means of said cylindrical body member is a lower flange attachment configured for securing the transmission in suspended combination with said main rotor assembly support truss.

14. The main rotor assembly support truss of claim 12 wherein the main rotor assembly includes a static rotor mast and wherein said cylindrical body member includes an upper flange attachment configured for securing the static rotor mast in combination with said main rotor assembly support truss.

15. The main rotor assembly support truss of claim 12 wherein said cylindrical body member includes three spaced apart servo lugs operative as lower attachment points for rotor servo actuators of the main rotor assembly.

* * * * *